(12) United States Patent
Lee et al.

(10) Patent No.: US 8,524,790 B2
(45) Date of Patent: Sep. 3, 2013

(54) STARCH FILM AND METHOD FOR MANUFACTURING STARCH FOAM

(75) Inventors: Jyi Hsiang Lee, Hsinchu (TW); Chei Kao, Hsinchu (TW); Ching-Chih Lai, Hsinchu (TW); Chin-Ying Tsai, Hsinchu (TW)

(73) Assignee: Industrial Technology Research Institute, Hsinchu County (TW)

( * ) Notice: Subject to any disclaimer, the term of this patent is extended or adjusted under 35 U.S.C. 154(b) by 228 days.

(21) Appl. No.: 13/041,412

(22) Filed: Mar. 6, 2011

(65) Prior Publication Data
US 2011/0159267 A1 Jun. 30, 2011

Related U.S. Application Data

(63) Continuation-in-part of application No. 12/118,693, filed on May 10, 2008, now abandoned.

(30) Foreign Application Priority Data

Dec. 27, 2007 (TW) ................................ 96150509 A

(51) Int. Cl.
| | |
|---|---|
| C08J 9/00 | (2006.01) |
| C08J 9/12 | (2006.01) |
| C08L 3/00 | (2006.01) |
| C08L 3/02 | (2006.01) |
| C08L 97/02 | (2006.01) |

(52) U.S. Cl.
USPC ............... 521/84.1; 521/82; 521/90; 521/97; 106/122; 106/162.51; 106/215.2; 106/215.3

(58) Field of Classification Search
CPC .................. C08J 9/00; C08J 9/26; B32B 3/00
USPC ............. 521/79, 82, 84.1, 90, 97; 428/315.7; 106/122, 162.51, 215.2, 215.3
See application file for complete search history.

(56) References Cited

U.S. PATENT DOCUMENTS

| | | | | |
|---|---|---|---|---|
| 5,308,879 | A | * | 5/1994 | Akamatu et al. ............. 521/84.1 |
| 5,756,556 | A | * | 5/1998 | Tsai et al. .................... 521/84.1 |
| 6,184,261 | B1 | * | 2/2001 | Biby et al. ................... 521/84.1 |
| 2001/0014388 | A1 | * | 8/2001 | Bastioli et al. ............. 428/315.7 |
| 2003/0119928 | A1 | * | 6/2003 | Tokiwa et al. ................ 521/82 |
| 2006/0111458 | A1 | * | 5/2006 | Narayan et al. ................ 521/79 |

FOREIGN PATENT DOCUMENTS

| | | |
|---|---|---|
| CN | 1639243 A | 7/2005 |
| TW | 328544 | 3/1998 |
| TW | 367352 | 8/1999 |

OTHER PUBLICATIONS

Examination opinion issued by the Taiwan Intellectual Property Office on Jul. 11, 2011, for the counterpart application in Taiwan (Application No. 096150509 filed Dec. 27, 2007).

* cited by examiner

*Primary Examiner* — Randy Gulakowski
*Assistant Examiner* — Kara Boyle
(74) *Attorney, Agent, or Firm* — Pai Patent & Trademark Law Firm; Chao-Chang David Pai

(57) ABSTRACT

A biodegradable starch film is provided. The biodegradable starch film includes a starch which is cross-linked by means of a cross-linking agent. The cross-linking agent comprises glycidyl methacrylate (GMA), octenyl succinic anhydride (OSA), or dodecyl succinic anhydride (DDSA) or combinations thereof. The cross-linking agent is 1 to 10 weight parts based on the starch of 100 weight parts. Furthermore, a method for manufacturing starch foam is also provided.

11 Claims, 2 Drawing Sheets

STARCH FILM AND METHOD FOR MANUFACTURING STARCH FOAM

This application is a Continuation-In-Part of pending U.S. patent application Ser. No. 12/118,693 filed May, 10, 2008 and entitled "Methods for Manufacturing Starch Foam", which claims priority of Taiwan Patent Application No. 96150509, filed on Dec. 27, 2007, the entirety of which is incorporated by reference herein.

BACKGROUND OF THE INVENTION

1. Field of the Invention

The invention relates to a starch film and a method for manufacturing a starch foam.

2. Description of the Related Art

The Waste Electrical and Electronic Equipment (WEEE) Directive (European Community directive 2002/96/EC) and the Restriction of Hazardous Substance (RoHS) Directive (European Community directive 2002/95/EC) have been published by the European Union (EU) since 2003, and obliges EU member states to transpose its provisions into national law for setting collection, recycling and recovery targets for all types of electrical goods. As of Jul. 2006, the maximum weight for the substances of lead, mercury, cadmium, chromium (VI), polybrominated biphenyls (PBB) and polybrominated diphenyl ethers (PBDE) are prohibited by the RoHS Directive. If an electronic equipment has these substances which exceed the limit, the electronic equipment will not be allowed into EU member states. Manufacturing products in consideration of environmental friendliness (or so-called "green products') is a major subject for the manufacturing industry. For green products, all parts of a product must conform to the proper directives. As such, manufacturing techniques specifically geared toward green products have increased in demand due to environmental friendliness.

With conventional plastics seldom being hard to self-decompose, they cause environmental issues when discarded. Thus, degradable plastics have been imported, researched and manufactured in many countries. Recently, developed countries have increased research for eco-materials, such as environmentally friendly materials. Meanwhile, cheap materials, such as PVC and EPS, are the main packaging materials previously used. Since PVC contains chlorine, it causes an environment issue during its whole life cycle, such as during production, use, and when discarded. PVC is called a "poison plastic" by Greenpeace International, and is deemed not fit for environmental demands. Thus, PVC has been substituted by polyolefin. However, no suitable material has been developed, that would feasibly be a substitute for ESP. Thus, increased methods for manufacturing and modeling materials which can be popularly or specially applied should be developed to meet demands for lower costs, recycling capabilities and environmental friendliness.

For example, cellulose, starch and chitosan are natural materials which can be decomposed in nature. In particular, starch is one of the best biodegradable raw materials due to its good processability and biodegradability.

Starch is a hydrophilic polymer and the hydroxyl groups therein react with the hydrogen bond of water. Thus, plastics formed of pure starch are not suitable for an environment with moisture. To address this issue, one solution is to mix the starch with hydrophobic polymers to improve water resistance. However, the compositions have shortcomings as performing uniform mixing is difficult and combining of the starch and the hydrophobic polymers may be weak.

Therefore, a starch composition capable of addressing the above issues is desired.

BRIEF SUMMARY OF INVENTION

A detailed description is given in the following embodiments with reference to the accompanying drawings.

The present invention provides an embodiment of a biodegradable starch film. The biodegradable starch film includes a starch which is cross-linked by means of a cross-linking agent. The cross-linking agent includes glycidyl methacrylate (GMA), octenyl succinic anhydride (OSA), or dodecyl succinic anhydride (DDSA) or combinations thereof. The cross-linking agent is 1 to 10 weight parts based on the starch of 100 weight parts.

The present invention provides another embodiment of a method for manufacturing starch foam. The method includes modifying a starch by a cross-linking agent, wherein the cross-linking agent includes glycidyl methacrylate (GMA), octenyl succinic anhydride (OSA), or dodecyl succinic anhydride (DDSA) or combinations thereof. The cross-linking agent is 1 to 10 weight parts based on the starch of 100 weight parts. The modified starch is mixed with a nucleating agent and a foaming agent to form a foamable mixture. The foamable mixture is foamed to form a foam.

BRIEF DESCRIPTION OF DRAWINGS

The present invention can be more fully understood by reading the subsequent detailed description and examples with references made to the accompanying drawings, wherein.

DETAILED DESCRIPTION OF INVENTION

Figure 1A:
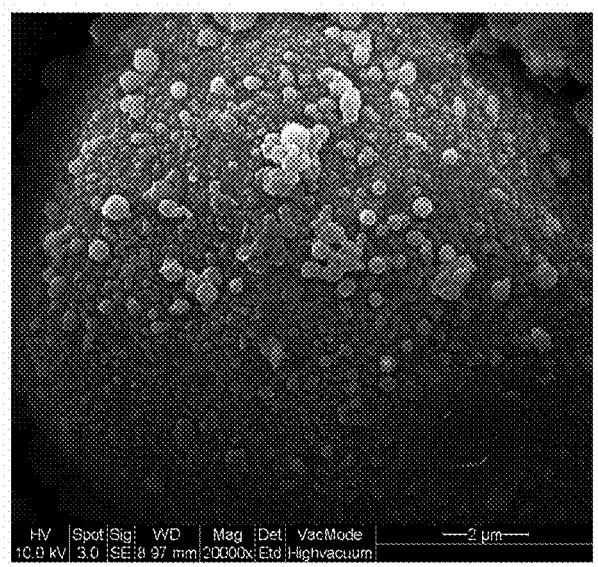
FIGS. 1(a) and 1(b) show the SEM images of the modified starch film in Example 1 and the non-modified starch film in Comparative Example 1, respectively.

A starch film and a method for manufacturing a starch foam of the present invention are described in detail as follows. The starch film may comprise a starch modified by a cross-linking agent. The starch may include a cereal or a root crop. The cereal may include rice, wheat, corn or other natural cereal plants. The root crop may include cassava, sweet potato, potato or other natural root crop plants. In addition to the cereal and the root crop, the starch may also include any plant having starch elements.

The starch has at least two hydroxyl groups capable of reacting with the cross-linking agent. Thus, by using the cross-linking agent, the hydroxyl groups of the starch may be transformed to hydrophobic groups resulting in improved water resistance of the modified starch. For example, the starch may be preferably modified by an epoxy cross-linking agent or an acid anhydride cross-linking agent, wherein the carbon numbers of the cross-linking agent are between 5 and 20 weight parts, preferably between 5 and 10 weight parts based on the starch of 100 weight parts. In the present embodiment, the cross-linking agent may be glycidyl methacrylate (GMA), octenyl succinic anhydride (OSA), or dodecyl succinic anhydride (DDSA) or combinations thereof. The cross-linking agent is 1 to 10 weight parts based on the starch of 100 weight parts.

Furthermore, the hydrogen bonds between the starches may be replaced with covalent bonds by means of the cross-linking agent such that stronger bonding (e.g., ester bond) and longer paths may be formed between the starches. The starches are highly cross-linked. Thus, the water penetrating path increases in length and the water vapor transmission rate is reduced.

For example, the starch film may have a thickness of between 0.02 and 0.10 mm. In one embodiment, the starch film may have a water vapor transmission rate of between $5.2*10^{-3}$ and $9.8*10^{-3}$ gm$^{-2}$s$^{-1}$, and may have a water vapor permeability of between $10.5*10^{-11}$ and $19.6*10^{-11}$ gm$^{-2}$s$^{-1}$Pa$^{-1}$.

In addition, a starch foam may be formed from the modified starch. The starch foam may include the modified starch, a nucleating agent, and a foaming agent. In one embodiment, the nucleating agent may include calcium carbonate, calcium hydroxide, silicate or other suitable nucleating agents. The nucleating agent is 0.1 to 20 weight parts based on the modified starch of 100 weight parts. The foaming agent may include water, carbon dioxide, nitrogen, oxygen, air, alcohol or other suitable foaming agents. The foaming agent is 0.1 to 20 weight parts based on the modified starch of 100 weight parts.

In addition to the modified starch, the nucleating agent, and the foaming agent, the starch foam may further include an additive and/or a plasticizing agent. The additive may include polyvinyl alcohol or other suitable additives. The additive is 0 to 50 weight parts based on the modified starch 100 weight parts. The plasticizing agent may include glycerol or other suitable plasticizing agents. The plasticizing agent is 0 to 30 weight parts based on the modified starch of 100 weight parts.

The starch foam is formed by the following steps: (a) the weighted modified starch and the weighted nucleating agent are put into a high speed mixer for mixing with a high speed of 3000 rpm for 1 minute and then left standing for 5 minutes, (b) the foaming agent, or appropriately the additive, the plasticizing agent and the cross-linking agent are put into the high speed mixture for mixing with a high speed of 3000 rpm for 3 minutes and then left standing for 5 minutes, mixing with a high speed of 3000 rpm for 3 minutes and then left standing for 5 minutes, and mixing with a high speed of 3000 rpm for 3 minutes and then left standing for 10 minutes, in sequence. Therefore the mixture is mixed to form the foamable mixture.

Next, the foamable mixture is foamed to form the foam. The foaming step includes mold press foaming or extrusion foaming. The mold compression foaming step includes pressing the foamable mixture, weighted by the electronic control system, into a mold by a hydraulic press system, and then mold compression foaming the foamable mixture at a pressure of 20-100 kg/cm$^2$ and a temperature of 120-180° C. to form the foam. The extrusion foaming step includes kneading the foamable mixture into grain by a twin-screw extruder, and then extrusion foaming the grain foamable mixture to form the foam by a single-screw extruder at a temperature of 120-180° C.

The following description is of the best-contemplated mode of carrying out the invention. This description is made for the purpose of illustrating the general principles of the invention and should not be taken in a limiting sense. The scope of the invention is best determined by reference to the appended claims.

Example 1

A corn starch-aqueous alcohol suspension was prepared and 3 weight parts of glycidyl methacrylate (GMA) (based on 100 weight parts of the corn starch) was added to the suspension. The suspension was stirred under $N_2$ at room temperature for 3 hours. Then, the suspension was stirred at 95° C. for 1 hour and gradually transformed to a gel. Finally, the gel was placed in a petri dish and dried at 60° C. for 3 hours to obtain a GMA modified starch film. The thickness, moisture content, water vapor transmission rate and water vapor permeability of the GMA modified starch film is shown in Table 1.

Example 2

A corn starch-aqueous alcohol suspension was prepared and 5 weight parts of octenyl succinic anhydride (OSA) (based on 100 weight parts of the corn starch) was added to the suspension. The pH value of the suspension was adjusted to about 8 and the suspension was stirred at room temperature for 24 hours. Then, the suspension was stirred at 80° C. for 1 hour and then at 95° C. for 1 hour. The suspension was gradually transformed to a gel. Finally, the gel was placed in a petri dish and dried at 60° C. for 3 hours to obtain an OSA modified starch film. The thickness, moisture content, water vapor transmission rate and water vapor permeability of the OSA modified starch film is shown in Table 1.

Example 3

A corn starch-aqueous alcohol suspension was prepared and its pH value was adjusted to 2.5. 7 weight parts of dodecyl succinic anhydride (DDSA) (based on 100 weight parts of the corn starch) was added to the suspension. The pH value of the suspension was adjusted to about 8 and the suspension was stirred at 35° C. for 3 hours. Then, the suspension was stirred at 80° C. for 1 hour and then at 95° C. for 1 hour. The suspension was gradually transformed to a gel. Finally, the gel was placed in a petri dish and dried at 60° C. for 3 hours to obtain a DDSA modified starch film. The thickness, moisture content, water vapor transmission rate and water vapor permeability of the DDSA modified starch film is shown in Table 1.

Comparative Example 1

A corn starch-aqueous alcohol suspension was prepared. Then, the suspension was stirred at 80° C. for 1 hour and then at 95° C. for 10 minutes. The suspension was gradually transformed to a gel. Finally, the gel was placed in a petri dish and dried at 60° C. for 3 hours to obtain a starch film. The thickness, moisture content, water vapor transmission rate and water vapor permeability of the starch film is shown in Table 1.

TABLE 1

Characteristics of the starch films in Examples 1-3 and Comparative Examples 1-3

|  | Thickness (mm) | Moisture content (%) | Water vapor transmission rate ($10^{-3}$ * gm$^{-2}$s$^{-1}$) | Water vapor permeability ($10^{-11}$ * gm$^{-2}$s$^{-1}$Pa$^{-1}$) |
|---|---|---|---|---|
| Example 1 (GMA) | 0.055 | 3.4 | 6.5 | 11.2 |
| Example 2 (OSA) | 0.065 | 6.8 | 7.2 | 14.6 |
| Example 3 (DDSA) | 0.06 | 4.6 | 6.9 | 12.9 |
| Comparative Example 1 (non-modified) | 0.065 | 9.2 | 7.8 | 15.8 |

As shown in Table 1, each of the modified starch films in Examples 1-3 had a water content much lower than the non-modified starch film in Comparative Example 1. In particular, the GMA modified starch film in Example 1 had a moisture content as low as 3.4% which is only about ⅓ of that of the non-modified starch film. Furthermore, the water vapor transmission rate and the water vapor permeability of each of the modified starch films in Examples 1-3 were also much lower than that of the non-modified starch film. From these results, it can be suggested that the starch film modified by the cross-linking agent may lead to the starch film being more hydrophobic and having longer paths for water penetration. Thus, the water resistance of the modified starch film was significantly improved.

Figure 1B:
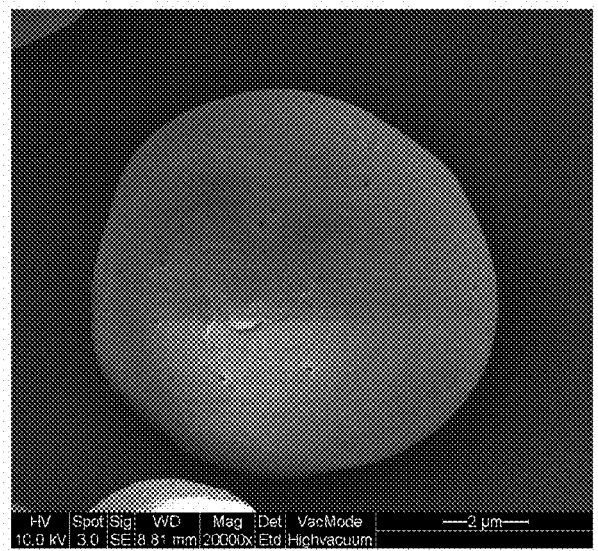

FIGS. 1(a) and 1(b) show the SEM images of the modified starch film in Example 1 and the non-modified starch film in Comparative Example 1, respectively. As shown in FIG. 1(a), it can be seen that block shaped structures of the modified starches were formed from the small starch particles shown in FIG. 1(b) after cross-linking. The longer paths between the starches for water penetration were clearly shown in the SEM images.

Examples 4~6

Powdery rice, calcium carbonate of the nucleating agent, glycerol of the plasticizing agent, water of the foaming agent, and GMA, OSA, DDSA of the cross-linking agent with ratios as shown in Tables 2~4, respectively, were well mixed to form a foamable mixture. The foamable mixture, weighted by using the electronic control system, was then pressed into the mold by using the hydraulic press system. Next, the foamable mixture was mold compression foamed to form the foam at a pressure of 20-100 kg/cm$^2$ and temperature of 120-180° C. The results of the Examples 4~6 are shown in Table 9.

Comparative Examples 2~4

Powdery rice, calcium carbonate of the nucleating agent, glycerol of the plasticizing agent, water of the foaming agent, and ethylene dialdehyde monomer, acetic anhydride monomer, methyl methacrylate monomer of the cross-linking agent with ratios as shown in Tables 5~7, respectively, were well mixed to form a foamable mixture. The foamable mixture, weighted by using the electronic control system, was then pressed into the mold by using the hydraulic press system. Next, the foamable mixture was mold compression foamed to form the foam at a pressure of 20~100 kg/cm$^2$ and temperature of 120-180° C. The results of the Comparative Examples 2~4 are shown in Table 9.

Comparative Example 5

Powdery rice, calcium carbonate of a nucleating agent, glycerol of a plasticizing agent, and water of a foaming agent were well mixed with ratios as shown in Table 8 to form a foamable mixture. The foamable mixture, weighted by the electronic control system, was pressed into the mold by using the hydraulic press system. Next, the foamable mixture was mold compression foamed form the foam at a pressure of 20-100 kg/cm$^2$ and temperature of 120-180° C. The result of the Comparative Example 5 is shown in Table 9.

TABLE 2

The components of the mixture for the Example 4

| component | weight |
| --- | --- |
| (powdery) rice | 100 |
| calcium carbonate | 8 |

TABLE 2-continued

The components of the mixture for the Example 4

| component | weight |
| --- | --- |
| glycerol | 5 |
| GMA | 5 |
| water | 30 |

TABLE 3

The components of the mixture for the Example 5

| component | weight |
| --- | --- |
| (powdery) rice | 100 |
| calcium carbonate | 8 |
| glycerol | 5 |
| OSA | 5 |
| water | 30 |

TABLE 4

The components of the mixture for the Example 6

| component | weight |
| --- | --- |
| (powdery) rice | 100 |
| calcium carbonate | 8 |
| glycerol | 5 |
| DDSA | 5 |
| water | 30 |

TABLE 5

The components of the mixture for the Comparative Example 2

| component | weight |
| --- | --- |
| (powdery) rice | 100 |
| calcium carbonate | 8 |
| glycerol | 5 |
| Ethylene dialdehyde monomer | 5 |
| water | 30 |

TABLE 6

The components of the mixture for the Comparative Example 3

| component | weight |
| --- | --- |
| (powdery) rice | 100 |
| calcium carbonate | 8 |
| glycerol | 5 |
| Acetic anhydride monomer | 5 |
| water | 30 |

TABLE 7

The components of the mixture for the Comparative Example 4

| component | weight |
| --- | --- |
| (powdery) rice | 100 |
| calcium carbonate | 8 |
| glycerol | 5 |
| Methyl methacrylate monomer | 5 |
| water | 30 |

TABLE 8

The components of the mixture for the Comparative Example 5

| component | weight |
|---|---|
| (powdery) rice | 100 |
| calcium carbonate | 8 |
| glycerol | 5 |
| water | 30 |

TABLE 9

Characteristics of EPS, and foams formed by the method according to the Examples 4~6 and Comparative Examples 2~5

| | Example 4 | Example 5 | Example 6 | Comparative Example 2 | Comparative Example 3 | Comparative Example 4 | Comparative Example 5 | EPS |
|---|---|---|---|---|---|---|---|---|
| density (g/cm$^3$) | 0.182 | 0.153 | 0.178 | 0.222 | 0.232 | 0.242 | 0.213 | 0.021 |
| pH value | 6.8 | 6.5 | 6.7 | 6.3 | 6.2 | 6.8 | 7.0 | 7.2 |
| dimension change (%) | +0.3 | +0.3 | +0.3 | +0.5 | +0.5 | +0.5 | +0.6 | +0.4 |
| compressive strength (kgf/cm$^2$) | 5.73 | 4.12 | 4.86 | 3.18 | 3.26 | 3.47 | 2.82 | 2.18 |
| biodegradation (%/day) | >70/45 | >70/45 | >70/45 | >70/45 | >70/45 | >70/45 | >70/45 | <10/180 |

Figure 2:
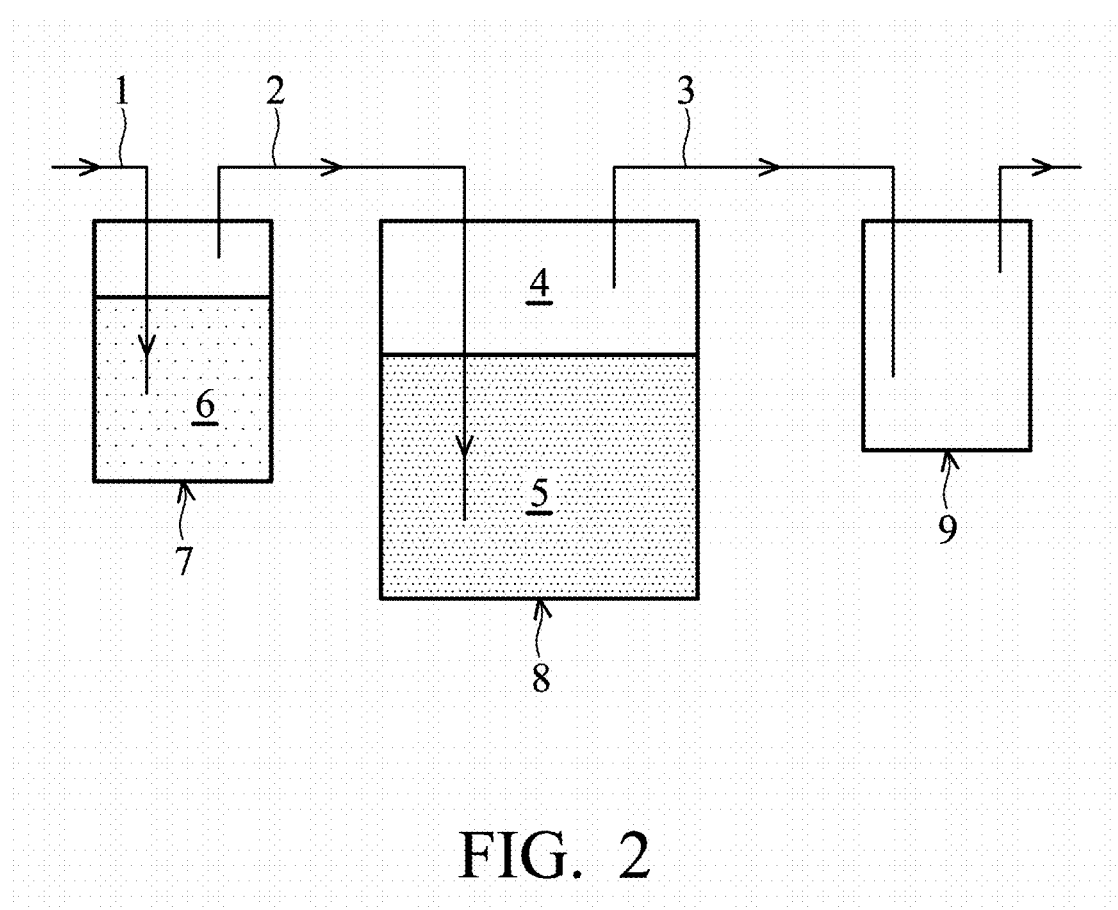
FIG. 2 illustrates a schematic view showing a biodegradation test system according to an embodiment of the invention.

The experimental results, illustrated in Table 9, show that the compressive strength of the foams formed by the methods according to the examples is stronger than that of the dialdehyde monomer, anhydride monomer, and acrylic monomer. Thus, the foams formed by the methods according to the examples withstood higher stress even with less density. Biodegradation tests were performed according to the CNS144321 national standard. The EPS and the foams of the Examples 4~6 and Comparative Examples 2~5 were tested for aerobic biodegradation and the disintegration, and analyzed for carbon dioxide liberation, in a muck environment by the method as shown in FIG. 2. An air 1 was flowed into a de-carbon dioxide system 7 containing a sodium hydroxide solution 6 to form an air without carbon dioxide 2. The air without carbon dioxide 2 was flowed into a muck container 8 containing a test compound 5, and was decomposed by the test compound 5 to form an air with carbon dioxide 3. The air with carbon dioxide 3 was tested for a quantity of carbon dioxide by a carbon dioxide test system 9. The test foams were put in a muck container 8 at a stable temperature of 58±2° C. and isolated from vapor that may affect organisms. The test was designed for the conversion ratio of the carbon elements of the test foams into the carbon dioxide. The duration of the test was generally 180 days. The biodegradation of the foams, formed by the methods according to the examples 4, 5, and 6, were 70% in the duration of only 45 days. Thus, the foams were defined as being biodegradable according to the CNS 144321 national standard. However, the biodegradation of the conventional EPS was lower than 10% in the duration of 180 days, thus showing that the conventional EPS does affect the global environment. Since the foams of the invention are manufactured using the cereal or the root crop of natural plants by the method according to the invention, the foams of the invention do not cause environmental pollution issues.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for manufacturing starch foam, comprising:
   modifying a starch by a cross-linking agent, wherein the cross-linking agent comprises glycidyl methacrylate (GMA), and the cross-linking agent is 1 to 10 weight parts based on the starch of 100 weight parts;
   mixing the modified starch with a nucleating agent and a foaming agent to form a foamable mixture; and
   foaming the foamable mixture to form a foam.

2. The method as claimed in claim 1, wherein the starch comprises a cereal, or a root crop.

3. The method as claimed in claim 2, wherein the cereal includes rice, wheat or corn.

4. The method as claimed in claim 1, wherein the nucleating agent comprises calcium carbonate, calcium hydroxide or silicate.

5. The method as claimed in claim 1, wherein the foaming agent comprises water, carbon dioxide, nitrogen, oxygen, air or alcohol.

6. The method as claimed in claim 1, wherein the modified starch further mixes with an additive, a plasticizing agent or combinations thereof.

7. The method as claimed in claim 6, wherein the additive comprises polyvinyl alcohol.

8. The method as claimed in claim 6, wherein the plasticizing agent comprises glycerol.

9. The method as claimed in claim 1, wherein the foaming step comprises mold press foaming or extrusion foaming.

10. The method as claimed in claim 9, wherein the mold press foaming and the extrusion foaming are performed at a temperature of 120-180° C.

11. The method as claimed in claim 1, wherein the starch foam has a biodegradation lower than 10% in a duration of 180 days.

* * * * *